(12) United States Patent
Li et al.

(10) Patent No.: US 10,693,373 B2
(45) Date of Patent: Jun. 23, 2020

(54) CURRENT SENSING METHOD FOR HYBRID CONVERTERS

(71) Applicant: LINEAR TECHNOLOGY HOLDING LLC, Norwood, MA (US)

(72) Inventors: Jian Li, San Jose, CA (US); San-Hwa Chee, San Ramon, CA (US)

(73) Assignee: Linear Technology Holding LLC, Norwood, MA (US)

( * ) Notice: Subject to any disclaimer, the term of this patent is extended or adjusted under 35 U.S.C. 154(b) by 0 days.

(21) Appl. No.: 16/112,593

(22) Filed: Aug. 24, 2018

(65) Prior Publication Data

US 2020/0067409 A1 Feb. 27, 2020

(51) Int. Cl.
*H02M 1/08* (2006.01)
*H02M 3/158* (2006.01)
*H02M 1/00* (2006.01)

(52) U.S. Cl.
CPC ............. *H02M 3/158* (2013.01); *H02M 1/08* (2013.01); *H02M 2001/0009* (2013.01)

(58) Field of Classification Search
CPC ............ H02M 3/07; H02M 2003/072; H02M 2001/009; H02M 2001/0009; H02M 1/08; H02M 3/158
See application file for complete search history.

(56) References Cited

U.S. PATENT DOCUMENTS

| | | |
|---|---|---|
| 6,304,460 B1 | 10/2001 | Cuk |
| 6,465,993 B1 | 10/2002 | Clarkin et al. |
| 6,534,962 B1 | 3/2003 | Lee |
| 6,828,762 B2 | 12/2004 | Brkovic |
| 8,330,437 B1 * | 12/2012 | Hartman ............. H02M 3/1588 323/222 |
| 8,823,352 B2 | 9/2014 | Zhang |
| 9,525,351 B2 | 12/2016 | Li et al. |

(Continued)

OTHER PUBLICATIONS

Evzelman and Ben-Yaakov, Modeling and Analysis of Hybrid Converters, Power Electronics Laboratory, Department of Electrical and Computer Engineering, Ben-Gurion University of the Negev, Israel, IEEE, 2012.

(Continued)

*Primary Examiner* — Nguyen Tran
*Assistant Examiner* — David A. Singh
(74) *Attorney, Agent, or Firm* — Schwegman Lundberg & Woessner, P.A.

(57) ABSTRACT

A hybrid power converter includes a switching circuit, an LC circuit, and a detection circuit. The switching circuit includes three or more switching transistors in series that may turn on or off according to a switching cycle to generate a series of voltage pulses at an output port across one of the switching transistors. The LC circuit may be coupled to the output port of the switching circuit to receive the series of pulses and to generate an inductor current in the LC circuit. The inductor current may charge a capacitor of the LC circuit to generate an output voltage of the hybrid power converter. The detection circuit may be coupled to the switching circuit and may generate a low frequency portion of the inductor current based on one or more currents of the switching transistors to adjust the switching cycle based at least on the low frequency portion.

19 Claims, 10 Drawing Sheets

(56) References Cited

U.S. PATENT DOCUMENTS

| | | | |
|---|---|---|---|
| 9,866,113 B1* | 1/2018 | Assaad | H02M 3/07 |
| 2001/0024373 A1 | 9/2001 | Cuk | |
| 2009/0033293 A1* | 2/2009 | Xing | H02J 7/0077 |
| | | | 320/164 |
| 2010/0237836 A1 | 9/2010 | Fahrenbruch et al. | |
| 2010/0283441 A1* | 11/2010 | Wang | H02M 1/14 |
| | | | 323/282 |
| 2011/0101948 A1 | 5/2011 | Lopata et al. | |
| 2014/0117961 A1 | 5/2014 | Rigoni | |
| 2015/0180333 A1* | 6/2015 | Jenkner | H02M 3/07 |
| | | | 327/536 |
| 2016/0261187 A1* | 9/2016 | Deng | H02M 3/1588 |
| 2017/0194860 A1* | 7/2017 | Oak | H02M 3/158 |
| 2017/0200723 A1 | 7/2017 | Zhang et al. | |
| 2017/0302174 A1 | 10/2017 | Yan et al. | |

OTHER PUBLICATIONS

Xingda Yan, Hybrid Modelling and Control for Switched-Mode Power Converters, University of Southampton, Mechatronics Research Group, Thesis Degree in Philosophy, Nov. 8, 2017.

\* cited by examiner

CURRENT SENSING METHOD FOR HYBRID CONVERTERS

FIELD OF THE DISCLOSURE

The disclosure relates generally to power converter circuits and, more particularly, to sensing an inductor current of the power converter circuits.

BACKGROUND

Hybrid power converter circuits provide efficient power solutions for power supply design. A hybrid power converter circuit is a type of power converter that provides direct current to direct current (DC-DC) conversion. A hybrid power converter contains one or more switching elements (e.g., one or more transistors) and reactive elements (e.g., capacitors and inductors). In connection with a periodic switching of the switching elements, the hybrid power converter may generate a current through an inductor to alternatively charge a capacitor and generate a sufficiently constant voltage through a load that may be coupled across the capacitor.

A shortcoming of existing direct current converters is that they may not provide a stable load voltage for a wide range of loads.

Accordingly, what is needed is a design for more control over the output voltage, without adding considerable cost and complexity, which can provide a constant output voltage across a wide range of loads.

SUMMARY OF DISCLOSURE

A hybrid power converter includes a switching circuit, an LC circuit, and a detection circuit. The switching circuit includes three or more switching transistors in series that may turn on or off according to a switching cycle to generate a series of voltage pulses at an output port across one of the switching transistors. The LC circuit may be coupled to the output port of the switching circuit to receive the series of pulses and to generate an inductor current in the LC circuit. The inductor current may charge a capacitor of the LC circuit to generate an output voltage of the hybrid power converter. The detection circuit may be coupled to the switching circuit and may generate a low frequency portion of the inductor current based on one or more currents of the switching transistors to adjust the switching cycle based at least on the low frequency portion. By adjusting the switching cycle of the switching circuit, the hybrid power converter may generate an essentially constant output voltage.

A hybrid power converter according to various implementations comprises a switching circuit that includes three or more switching transistors connected in series. The hybrid power converter also includes an LC circuit that includes a capacitor and an inductor connected in series. The LC circuit may be coupled to the switching circuit to receive a first voltage from the switching circuit. The hybrid power converter also includes a detection circuit that may be coupled to switching circuit and the LC circuit and to generate a sensed voltage proportional to a current through the inductor. The switching circuit may generate the first voltage based on the sensed voltage and to generate, based on the sensed voltage, an essentially constant output voltage across the capacitor of the LC circuit.

A method of operating a hybrid power converter according to various implementations comprises pre-charging one or more capacitors of a switching circuit to one or more respective voltages. After pre-charging, applying switching signals according to a switching cycle to three or more switching transistors of the switching circuit. The switching cycle comprises two or more duty cycles for the switching signals. The method includes providing a first voltage by the switching circuit to an LC circuit comprising a capacitor and an inductor connected in series. The method also includes providing a voltage of the capacitor of the LC circuit as an output voltage of the hybrid power converter. The method further includes generating a sensed voltage proportional to an inductor current of the LC circuit and adjusting the two or more duty cycles based on the sensed voltage to generate the output voltage at an essentially constant value.

A hybrid power converter according to various implementations comprises means for applying switching signals to a switching circuit and means for turning on or off switching transistors of the switching circuit with the switching signals. The hybrid power converter also includes means for applying an input voltage to the switching circuit and means for providing a series of pulses to an LC circuit. The hybrid power converter further includes means for detecting an inductor current of the LC circuit, means for controlling duty cycles of the switching signals based on the inductor current, and means for providing an essentially constant output voltage by the LC circuit.

Other aspects disclosed herein include corresponding methods, systems, apparatuses, and electronic device products for implementation of the switched power converter. It is understood that other configurations will become readily apparent to those skilled in the art from the following detailed description, wherein various exemplary configurations and implementations are shown and described by way of illustration.

BRIEF DESCRIPTION OF THE DRAWINGS

The accompanying drawings are presented to aid in the description of example aspects and are provided solely for illustration of embodiments and not limitation thereof.

DETAILED DESCRIPTION

Figure 1A:
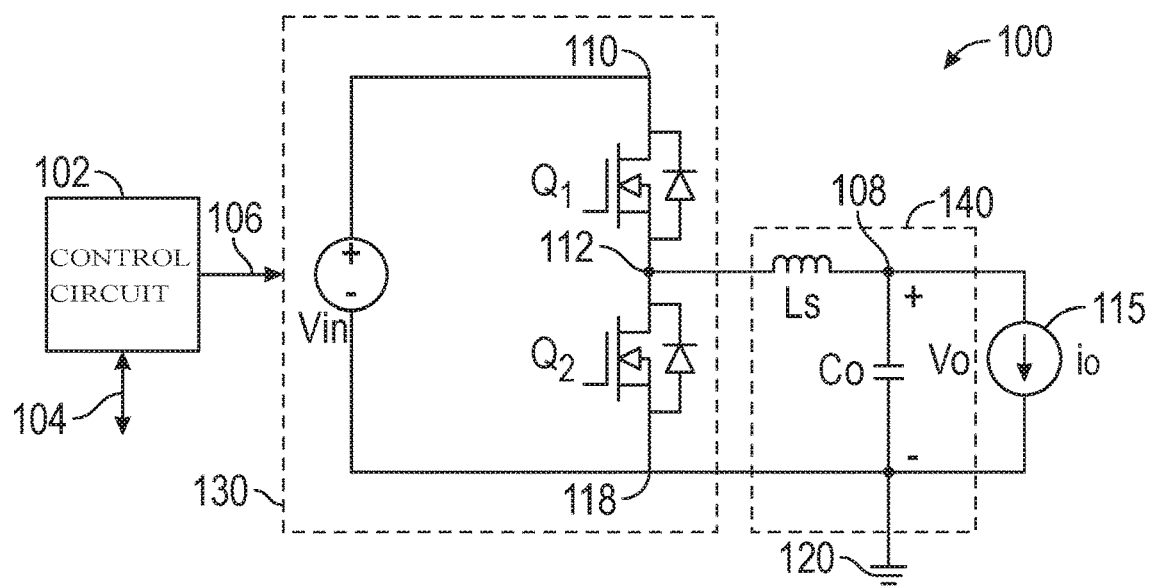
FIGS. 1A-1C are diagrams of an exemplary power converter, switching signals of the power converter, and current waveforms of the power converter, according to some embodiments.

Aspects and features, and exemplary implementations practices and applications are disclosed in the following description and related drawings. Alternatives to disclosed examples may be devised without departing from the scope of disclosed concepts.

The term "converter," as used herein, encompasses but is not limited to any one of, or any combination of "regulator," "DC regulator," "voltage regulator," "DC voltage regulator," "DC-DC converter," "DC converter" and "converter," and includes, but is not limited to, the plain meaning of any one or more of these terms.

The subject disclosure provides a hybrid power converter that includes a switching circuit, an LC circuit, and a detection circuit. The switching circuit includes three or more switching transistors in series. The three or more switching transistors of the switching circuit that are in series have a first end a second end. Each of the three or more switching transistors may be connected to an adjacent switching transistor of the three or more switching transistors by a respective node of a plurality of nodes. An input voltage, e.g., a DC voltage, may be coupled between the first end the second end and the second end may be coupled to a ground. A control circuit may be couple to the switching transistors to generate switching signals that may be provided to the switching transistors to turn on or off the switching transistors according to a switching cycle. The turning on or off the switching transistors may generate a series of voltage pulses between any node of the plurality of nodes and the ground. An output port of the switching circuit may be defined between any node of the plurality of nodes and the ground. In some examples, the output port is defined across one of the switching transistors.

The LC circuit may be coupled to the output port of the switching circuit to receive the series of pulses and to generate an inductor current in the LC circuit. The inductor current may vary and may increase and decrease. The inductor current may charge a capacitor of the LC circuit to generate an output voltage of the hybrid power converter. The detection circuit may include one or more current sensors that may be coupled to one or more of the switching transistors of the switching circuit and may generate a first sensed current proportional a sum of the currents, e.g., drain to source currents, of the one or more switching transistor. The first sensed current may pass through a low pass filter to generate a first sensed voltage. In some embodiments, the first sensed voltage is proportional to a low frequency portion (essentially a DC portion) of the inductor current. In some embodiments, the switching noise of switching transistors may essentially be of high frequency content and the low pass filtering may attenuate the switching noise of the first sensed voltage. In some embodiments, a high pass filter may be coupled to the LC circuit to allow a current proportional to high-frequency ripple current of the inductor to pass through the high pass filter and to generate a second sensed voltage proportional to a high frequency portion of the inductor current. Adding the first sensed voltage and the second sensed voltage may generate a total sensed voltage proportional to the inductor current such that in the total sensed voltage, the switching noise of the transistors is substantially, e.g., up to 95 percent, attenuated. In some embodiments, the control circuit may receive the total sensed voltage and may use the total sensed voltage to adjust the switching cycle. Adjusting the switching cycle may include modifying one or more duty cycles of the switching signals according to the total sensed voltage such that the output voltage is essentially a constant value under different load conditions. In some examples, different load values may be driven by the output voltage of the hybrid power converter and thus different inductor current may be generated. The control circuit may modify on or more duty cycles of the switching signals that turn the switching transistors on or off to keep the output voltage at an essentially constant predefined value.

Figure 1B:
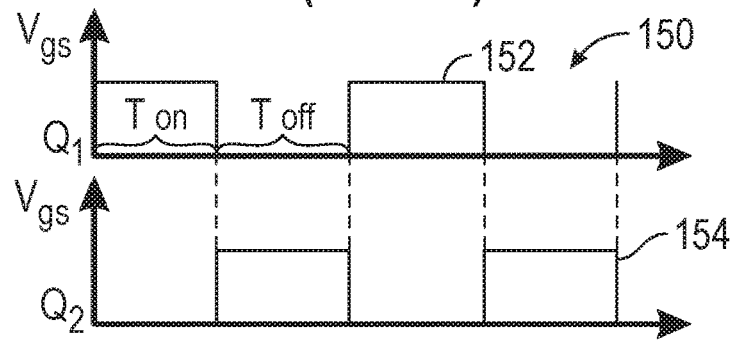
Figure 1C:
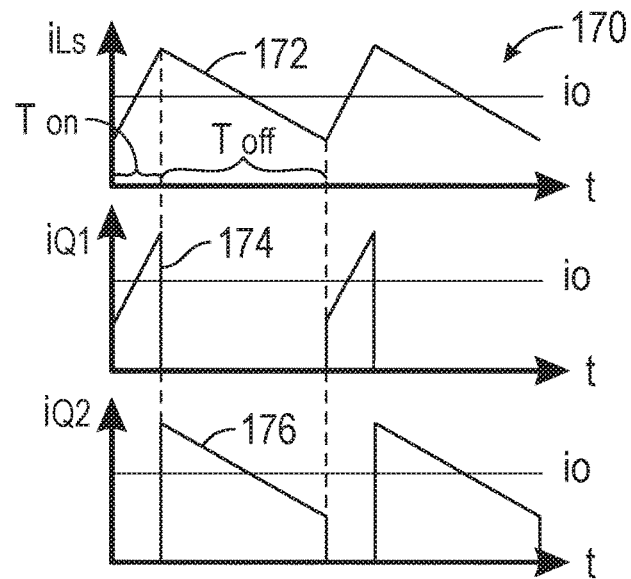

FIGS. 1A-1C are diagrams of an exemplary power converter, switching signals of the power converter, and current waveforms of the power converter, according to some embodiments. FIG. 1A includes an exemplary power converter, e.g., a buck power converter 100. In some examples, buck power converter 100 includes a switching circuit 130, which includes two switching transistors Q1 and Q2 that are connected in series. Switching transistor Q1 may switch on or off complimentary to switching transistor Q2 according to a switching cycle (e.g., at a predetermined switching frequency and duty cycle) to drive LC circuit 140. In some examples, switching transistor Q1 may switch on for a duration of Ton and may switch off for a duration of Toff providing duty cycle D=Ton/(Ton+Toff) for switching transistors Q1. In some examples, switching transistor Q1 and switching transistor Q2 may be switched at a 50% duty cycle, wherein the switching transistor Q1 is switched on or off in phase opposition to switching transistor Q2 for exactly the same time period. In some examples, the duty cycle D of the switching transistors Q1 is less than 50% and the duty cycle of the switching transistors Q2 is more than 50% or vice versa. LC circuit 140 includes one or more inductors Ls and one or more capacitors Co that may be energized by each pulse from switching circuit 130. In some embodiments, capacitance Co has a large value and provides smoothing function for the output voltage Vo of the buck power converter 100.

FIG. 1B includes switching signals 150 of the buck power converter of FIG. 1A. Power flow through LC circuit 140 may be controlled by changing the switching frequency of switching transistor Q1 and switching transistor Q2 (e.g., by changing the frequency of the switching signals 152 and 154), changing the duty cycle, or both. In some examples, output power may be increased or decreased by changing the duty cycle. In some examples, capacitance Co has a large value and the switching frequency is very different and may be at least ten time larger (e.g., between 100 kHz to 2 MHz) than a resonant frequency of LC circuit 140 and thus output power may be controlled by the duty cycle.

As shown in FIG. 1A, switching circuit 130 further includes node 112 that is coupled between two switching transistors and links the two switching transistors. Switching circuit 130 also includes nodes 110 and 118 that are coupled to one switching transistor. Node 118 couples a transistor to ground 120 and node 110 couples a transistor to input source Vin that is coupled between node 110 and ground 120. LC circuit 140 is coupled between node 112 of switching circuit 130 and the ground. An output voltage is defined as the voltage across capacitor Co that is coupled between node 108 of LC circuit 140 and ground 120.

Power converter 100 may include, as depicted in FIG. 1A, a control circuit 102 configured to provide the switching signals 106 that can be coupled to gates of the transistors Q1 and Q2. Switching signals 106 may provide switching signals 152 and 154 that are square wave signals. In some embodiments, the switching signals 106 of control circuit 102, in addition to providing the switching signals of the switching transistors may provide control signals to control other switches of the power converter 100 and may connect or disconnect another circuit to the power converter 100.

According to various implementations, control circuit 102 may be a pulse-width modulation (PWM) controller that generates PWM signals to switching circuit 130 to switch the switching transistors (e.g., Q1 and Q2) on or off according to a set switching frequency and/or duty cycle. In this regard, control circuit 102 may include an input/output (I/O) interface 104, and may be programmed (e.g., before start-up of the power converter) with a predetermined switching frequency and/or duty cycle, for example, by way of the I/O interface 104. Switching signals 106, e.g., control signals, may be transmitted as first switching signal 152 by control circuit 102 to the gate of switching transistor Q1 to switch on Q1, and transmitted as a second switching signal 154 to switch off the transistors Q2.

As shown in FIG. 1A, a current source 115 is coupled to output voltage of the power converter 100. Current source 115 draws current io that may represent a load current of load coupled to the output the power converter 100.

FIG. 1C includes current waveforms 170 of the buck power converter of FIG. 1A. Current waveform 172 may represent current iLs of inductor Ls. As shown, by switching transistors Q1 and Q2, the current through inductor Ls changes about an average current io, which is the output current through a load, coupled to output Vo of the power converter 100. As shown, the transistors Q1 and Q2 are turned on and off such that a constant average output current is provided. Current waveform 174 may represent current iQ1 of switching transistor Q1 and current waveform 176 may represent current iQ2 of switching transistor Q2. As shown iQ1 and iQ2 are only flowing when a corresponding switching transistor is on. Additionally, iLs is a sum of iQ1 and iQ2. Also as shown, the average output current io can be estimated from both iQ1 and iQ2 by averaging them during the on-time of the corresponding transistors.

Figure 2A:
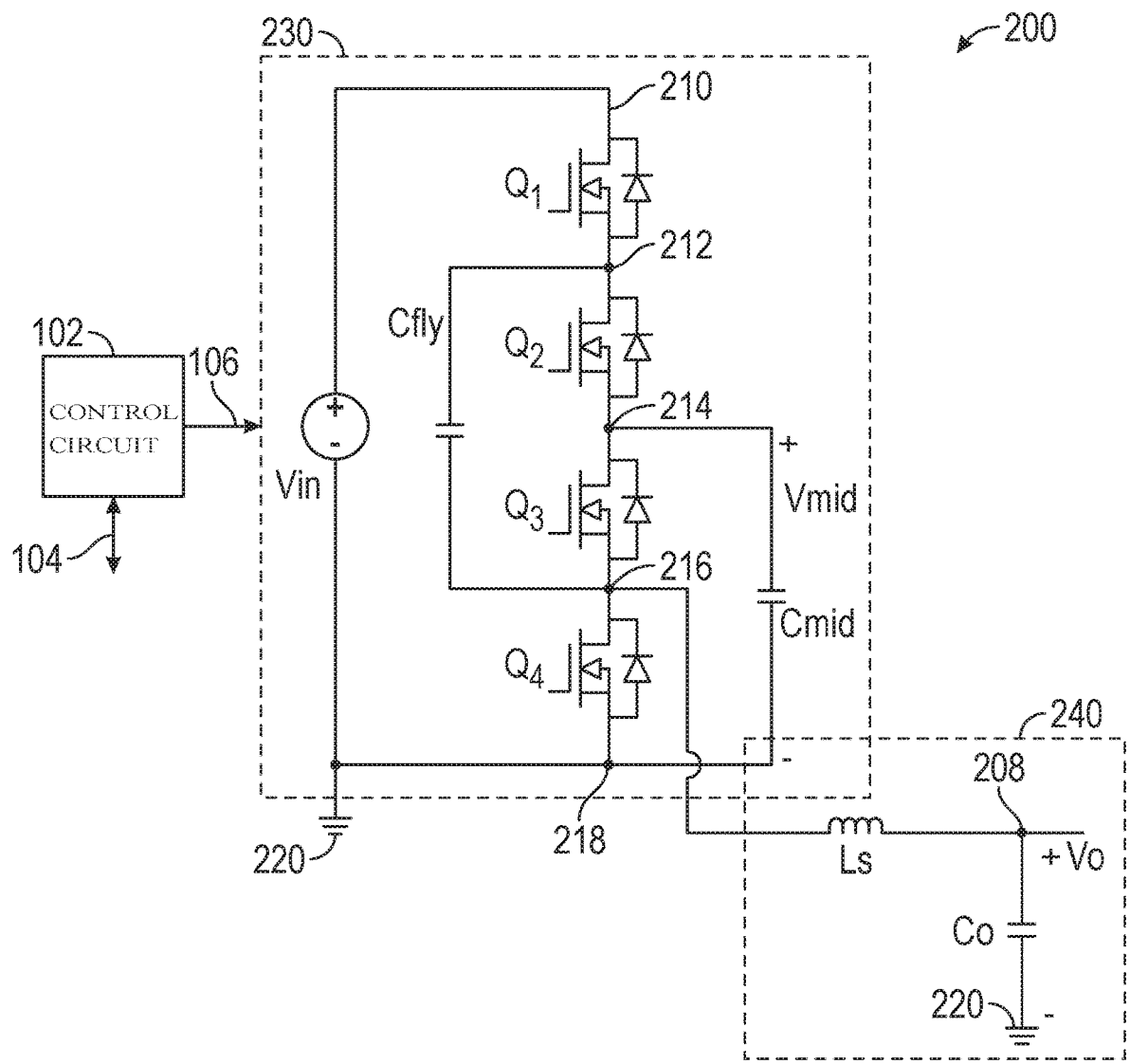
FIGS. 2A-2C are diagrams of an exemplary hybrid power converter, switching signals of the hybrid power converter, and current waveforms of the hybrid power converter.
Figure 2B:
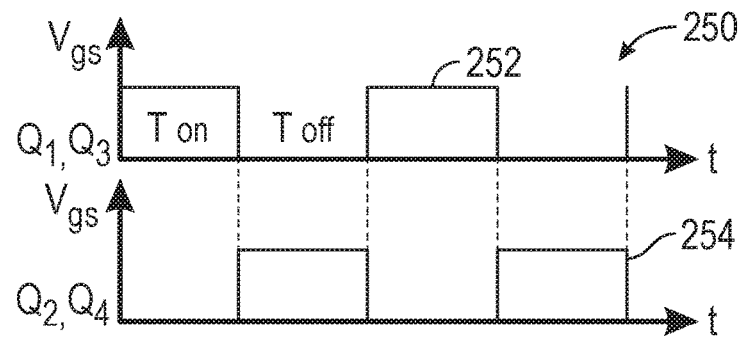
Figure 2C:
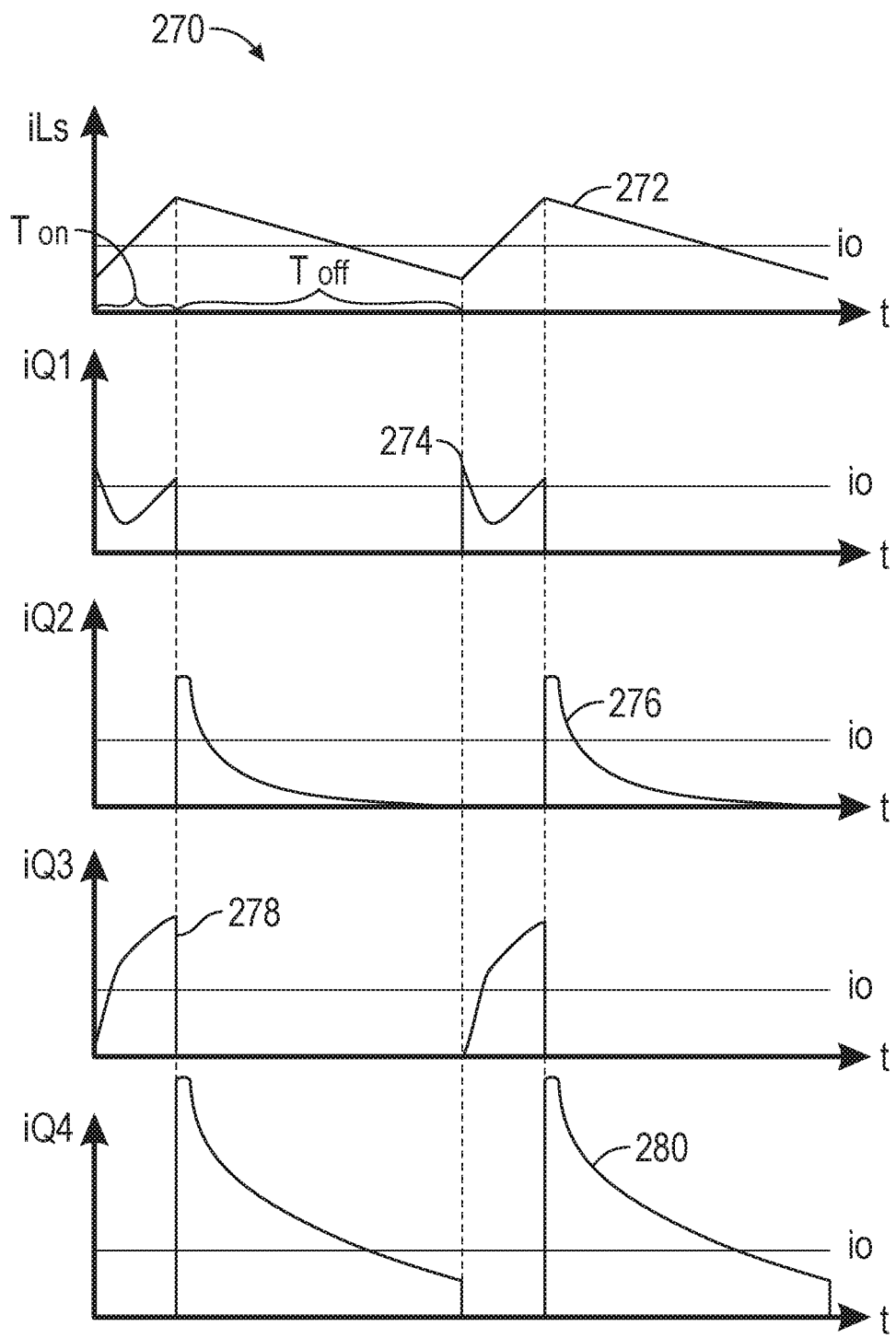

FIGS. 2A-2C are diagrams of an exemplary hybrid power converter, switching signals of the hybrid power converter, and current waveforms of the hybrid power converter. FIG. 2A includes an exemplary hybrid power converter, e.g., a hybrid PWM converter 200. In some examples, hybrid power converter 200 includes a switching circuit 230, which includes four switching transistors Q1, Q2, Q3, and Q4 that are connected in series. Switching transistors Q1 and Q3 may switch on or off complimentary to switching transistors Q2 and Q4 according to a switching cycle (e.g., at a predetermined switching frequency and duty cycle) to drive LC circuit 240. In some examples, switching transistors Q1 and Q3 may switch on for a duration of Ton and may switch off for a duration of Toff providing duty cycle D=Ton/(Ton+Toff) for switching transistors Q1 and Q3. In some examples switching transistors Q1 and Q3 and switching transistors Q2 and Q4 may be switched at a 50% duty cycle, wherein the switching transistors Q1 and Q3 is switched on or off in phase opposition to switching transistors Q2 and Q4 for exactly the same time period. In some examples, the duty cycle D of the switching transistors Q1 and Q3 is less than 50% and the duty cycle of the switching transistors Q2 and Q4 is more than 50% or vice versa. LC circuit 240 includes one or more inductors Ls and one or more capacitors Co that are energized by each pulse that is received from switching circuit 230. In some embodiments, hybrid power converter 200 is a hybrid PWM converter and amplitude of the output voltage Vo is ½ Vin times the duty cycle D. In some embodiments, capacitance Co has a large value, e.g., between 1 mF and 5 mF, and provides smoothing function for the output voltage Vo of the hybrid PWM converter 200.

FIG. 2B includes switching signals 250 of hybrid converter of FIG. 2A. Power flow through LC circuit 240 may be controlled by changing the switching frequency of switching transistors Q1 and Q3 and switching transistors Q2 and Q4 (e.g., by changing the frequency of the switching signals 252 and 254), changing the duty cycle, or both. For example, power may be increased or decreased while the frequency is fixed by increasing or reducing the duty cycle.

As shown in FIG. 2A, switching circuit 230 further includes nodes 212, 214, and 216 that are coupled between two switching transistors and link the two switching transistors. Switching circuit 230 also includes nodes 210 and 218 that are coupled to one switching transistor. Node 218 couples a transistor to ground 220 and node 210 couples a transistor to input source Vin that is coupled between node 210 and ground 220. Switching circuit 230 further includes flying capacitor Cfly that is coupled between nodes 212 and 216 and capacitor Cmid that is coupled between nodes 214 and 218. In addition, LC circuit 240 is coupled between node 216 of switching circuit 230 and the ground. An output voltage is defined as the voltage across capacitor Co that is coupled between node 208 of LC circuit 240 and ground 220. In some examples, an input port of the LC circuit 240 is defined between the ground and a node of LC circuit 240 coupled to node 216 of switching circuit 230.

Hybrid power converter 200 may include, as depicted in FIG. 2A, a control circuit 102 configured to provide the switching signals 106 that can be coupled to gates of the transistors Q1-Q4. Switching signals 106 may provide switching signals 252 and 254 that are square wave signals. In some embodiments, the switching signals 106 of control circuit 102, in addition to providing the switching signals of the switching transistors may provide control signals to control other switches of the hybrid power converter 200 and may connect or disconnect a portion of the hybrid power converter 200.

According to various implementations, control circuit 102 may be a pulse-width modulation (PWM) controller that generates PWM switching signals to switching circuit 230 to switch the switching transistors (e.g., Q1-Q4) on or off according to a set switching frequency and/or duty cycle. As described, control circuit 102 may include an input/output (I/O) interface 104, and may be programmed (e.g., before start-up of the converter) with a predetermined switching frequency and/or duty cycle, for example, by way of the I/O interface 104. In some examples, control circuit 102 may receive a feedback signal from interface 104 and the control circuit may use the feedback signal to adjust the PWM switching signals 106 that are used for turning switching transistors Q1-Q4 on or off. Switching signals 106, e.g., control signals, may be transmitted as first switching signal 252 by control circuit 102 to the gates of switching transistors Q1 and Q3 to switch on Q1 and Q3, respectively, and transmitted at a second switching signal 254 to switch off the transistors Q2 and Q4.

In some embodiments, before switching of the switching transistor Q1-Q4, the flying capacitor that is coupled between nodes 212 and 216 and capacitor Cmid that is coupled between nodes 214 and 218 are each pre-charged to a predefined value, e.g., ½ of Vin, via a separate pre-charging circuit that is controlled by control circuit 102 and control circuit 102 may turn on the switches that couple the pre-charging circuit to flying and Cmid capacitors. The pre-charging of capacitors Cfly and Cmid may reduce high reactive stress during a start-up of the converter. In some examples, during pre-charging the switching transistor Q1-Q4 are turned off.

FIG. 2C includes current waveforms 270 of the hybrid power converter of FIG. 2A, Current waveform 272 may represent current iLs of inductor Ls. As shown, by switching transistors Q1, Q2, Q3, and Q4, the current through inductor Ls changes about an average current io, which is the output current through a load, coupled to output of the power converter 200. As shown the transistors Q1 and Q3 and also Q2 and Q4 are turned on and off such that a constant average output current io is provided. Current waveforms 274, 276, 278, and 280 may respectively represent currents iQ1 of switching transistor Q1, current iQ2 of switching transistor Q2, current iQ3 of switching transistor Q3, and current iQ4 of switching transistor Q4. As shown, the currents are only flowing when a corresponding switching transistor is on. As shown, the currents iQ1, iQ2, iQ3, and iQ4 may charge and discharge the flying capacitor Cfly and capacitor Cmid and thus the currents iQ1, iQ2, iQ3, and iQ4 may partially pass through inductor Ls and thus iLs may not be a sum of iQ1, iQ2, iQ3, and iQ4. In some embodiments, having four switching transistors Q1-Q4 and flying capacitance Cfly and capacitance Cmid provides additional control over power converter 100 for generating a constant output voltage under different load conditions.

In some embodiments, hybrid power converter 200 includes switching circuit 230 that comprises a plurality of switching transistors Q1, Q2, Q3, and Q4 connected in series and having a first end and a second end. Each pair of switching transistors Q1 and Q2, Q2 and Q3, and Q3 and Q4, of the plurality of switching transistors are connected by a node from a plurality of nodes. In some examples, the pair Q1 and Q2 are connected by node 212, the pair Q2 and Q3 are connected by node 214, and the pair Q3 and Q4 are connected by node 216. First capacitor Cfly is coupled between node 212 of the plurality of nodes and node 216 of the plurality of nodes. Second capacitor Cmid is coupled between node 214 of the plurality of nodes and node 218. Node 218 is different from the plurality of nodes and is coupled to the second end of the plurality of switching transistors Q1, Q2, Q3, and Q4. Also, LC circuit 240 comprises third capacitor Co and inductor Ls that are connected in series. LC circuit 240 further comprises an input port. The input port of LC circuit 240 is coupled to the switching circuit 230 between node 216 and node 218 which is also ground 220. LC circuit 240 may be configured to receive a series of pulses from the switching circuit 230 and to provide an output voltage across capacitor Co. In some examples, output voltage Vo is defined from node 208 to ground 220.

In some embodiments, power converter 200 includes control circuit 102. Control circuit 102 may be coupled to switching circuit 230 to provide switching signals, e.g., switching signals 252 and 254 of FIG. 2B, to the plurality of switching transistors Q1, Q2, Q3, and Q4 to switch the plurality of switching transistors according to a switching cycle. Control circuit 102 may generate the switching signals 252 and 254 at a first frequency. Switching circuit 230 may provide a series of pulses as the switching signals at the first frequency to LC circuit 240 to cause inductor Ls of the LC circuit to generate a current iLs at the first frequency (shown in FIG. 2C). Current iLs of inductor Ls with the current waveform 272 of FIG. 2C may provide output voltage Vo across the capacitor Co of the LC circuit 240.

In some embodiments, input voltage Vin is coupled between a ground that is coupled to ground node 220 and node 210 that is different from the plurality of nodes and is coupled to the first end of the plurality of switching transistors Q1, Q2, Q3, and Q4. An essentially constant output voltage Vo of the hybrid power converter is provided across the Co of the LC circuit.

In some examples, a voltage and/or current, e.g., an output voltage and/or an output current of a hybrid power converter, or a voltage or current of an element of a hybrid power converter, e.g., hybrid power converter 200, may be defined as within a percent range (e.g., 20 percent above or below) of a voltage value and/or current value that may be defined as an essentially constant voltage value and/or current value.

In some embodiments, switching transistors are MOSFETs and a current of the switching transistors are detected by a direct measurement of drain to source voltages of the switching transistor and dividing a measured voltage by a predetermined drain to source resistance Rds.

Figure 3:
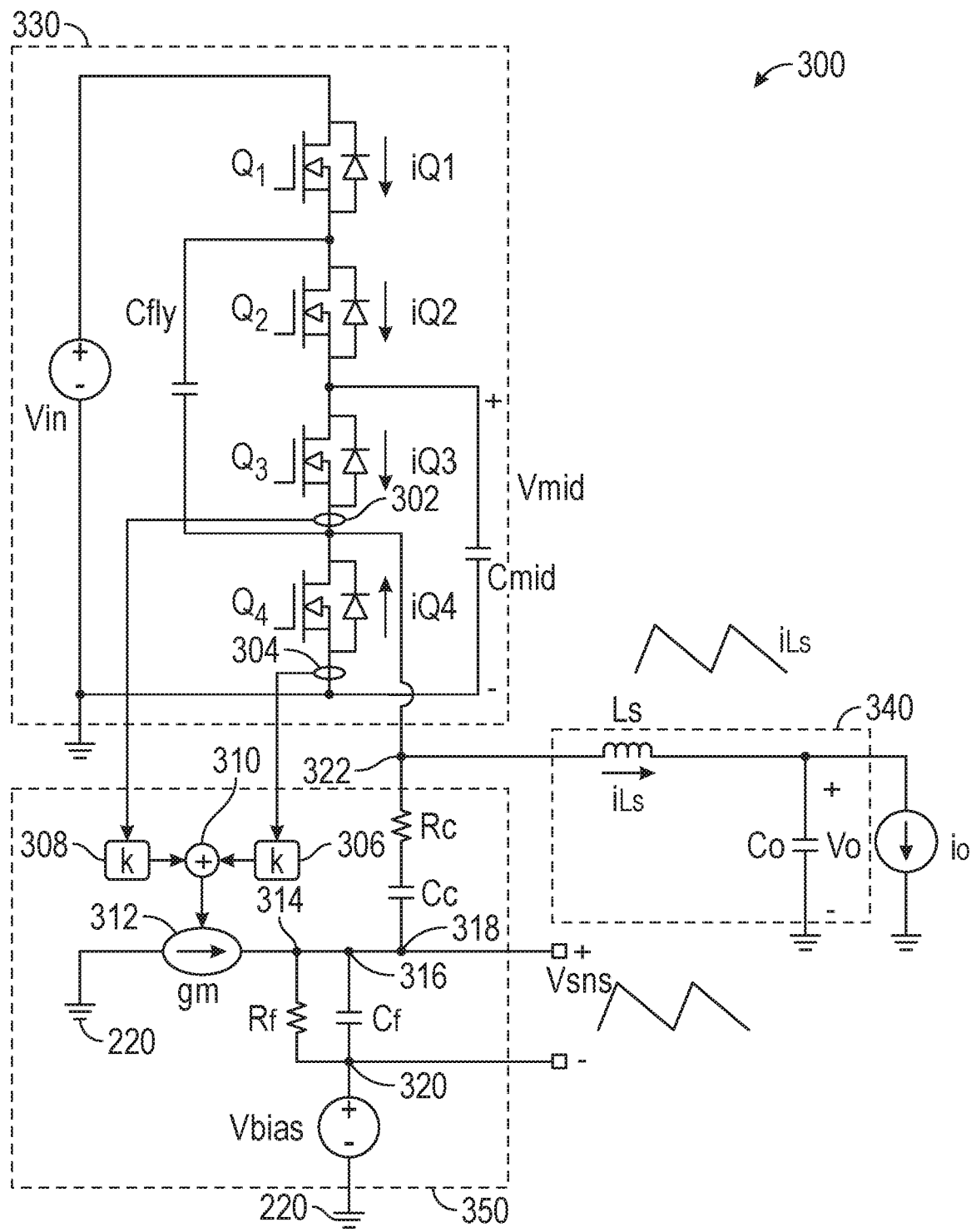
FIG. 3 is a circuit diagram of an exemplary hybrid power converter with a feedback circuit, according to some embodiments.

FIG. 3 is a circuit diagram of an exemplary hybrid power converter with a feedback circuit, according to some embodiments. Hybrid power converter 300 of FIG. 3 includes switching circuit 330 that is consistent with switching circuit 230 of FIG. 2A and includes the four switching transistors Q1-Q4, the flying capacitor Cfly, and capacitor Cmid. In some embodiments, switching transistors Q1-Q4 receive switching signals 106 that are consistent with switching signals 250 of FIG. 2B from control circuit 102 to turn the switching transistors on and off. Hybrid power converter 300 also includes LC circuit 340 that is consistent with LC circuit 240 of FIG. 2A.

In some embodiments, Hybrid power converter 300 additionally includes detection circuit 350. Detection circuit 350 includes current sensors 302 and 304 for respectively detecting a current, e.g., drain-to-source current Ids, of switching transistors Q3 and Q4. The detected currents of the switching transistors Q3 and Q4 may then be amplified by current amplifiers 306 and 308 and then summed by summation circuit 310. The sum of the amplified currents of the switching transistors Q3 and Q4 may further pass through another amplifier 312 that is coupled between ground 220 and node 314 of a low pass filter comprising Rf and Cf in parallel. The low pass filter may provide an essentially DC voltage, e.g., a slow varying low frequency voltage, at the output of the low pass filter between nodes 318 and 320. In some examples, a DC bias, Vbias, is provided between ground 220 and the output of the low pass filter to offset the output voltage of the low pass filter. In some examples, the offset of output voltage of the low pass filter is provided to prevent a negative voltage at the output voltage of the low pass filter. In some examples, as shown in FIG. 2C, the output voltage of the low pass filter is essentially proportional to current io, which is an essentially DC portion, e.g., a slow varying low frequency portion, of current iLs. In some examples, the output voltage of the low pass filter in addition to io includes an attenuated portion of time variations of iLs and may also include an attenuated switching noise of switching transistors Q3 and Q4. In some embodiments, nodes 316 and 318 are short-circuited and are essentially a same node.

In some embodiments, detection circuit 350 further includes a high pass filter. The high pass filter, Rc and Cc in series, is coupled between node 322 of the inductor Ls and node 318. In some embodiments, the high pass filter detects the high frequencies of the inductor current iLs. In some embodiments, the output of the detection circuit 350 between nodes 318 and 320 creates an output voltage Vsns that includes both low pass filtered version and high pass filtered version of iLs and thus voltage Vsns is proportional to iLs. In some examples, voltage Vsns is coupled through interface 104 to control circuit 102 and control circuit 102 provides the switching signals 106 based on voltage Vsns to control inductor current iLs and to ensure an essentially constant output voltage of the hybrid power converter under different load conditions. In some embodiments, providing Vsns to interface 104 provides a feedback of the inductor current to control circuit 102. In some examples, a feedback of output voltage and/or output current io may also be provided to control circuit 102.

In some embodiments, a detection circuit, e.g., detection circuit 350 includes a first current sensor 302 that is coupled to a first switching transistor Q3 of the plurality of switching transistor. The first current sensor 302 may detect a first current of the switching transistor Q3 to generate a first sensed current proportional to the first current. Detection circuit 350 includes a second current sensor 304 that is coupled to switching transistor Q4 of the plurality of switching transistor. The second current sensor 304 may detect a second current of the second switching transistor Q4 to generate a second sensed current proportional to the second current. Detection circuit 350 also includes a first summation circuit 310 that may sum the first and second sensed currents and to generate a third current proportional to a sum of the first and second sensed currents. In some examples, the first and second sensed currents may be amplified by current amplifiers 306 and 308 before being applied to the first summation circuit 310. Detection circuit 350 also includes a low pass filter that coupled to the summation circuit and may receive the third current and to generate a first sensed voltage. Detection circuit 350 also includes a high pass filter that is coupled to the inductor of the LC circuit and may receive a fourth current proportional to a current of the inductor and to generate a second sensed voltage proportional to the current of the inductor. Detection circuit 350 also a second summation circuit coupled to the low pass and high pass filters and configured to sum the first and second sensed voltages and to generate a total sensed voltage Vsns. The second summation circuit may be coupled to the control circuit 102 via interface 104 to provide the total sensed voltage to the control circuit 102. The control circuit 102 may adjust the switching signals based on the total sensed voltage Vsns to generate an essentially constant output voltage for the hybrid power converter for different load conditions.

Figure 4:
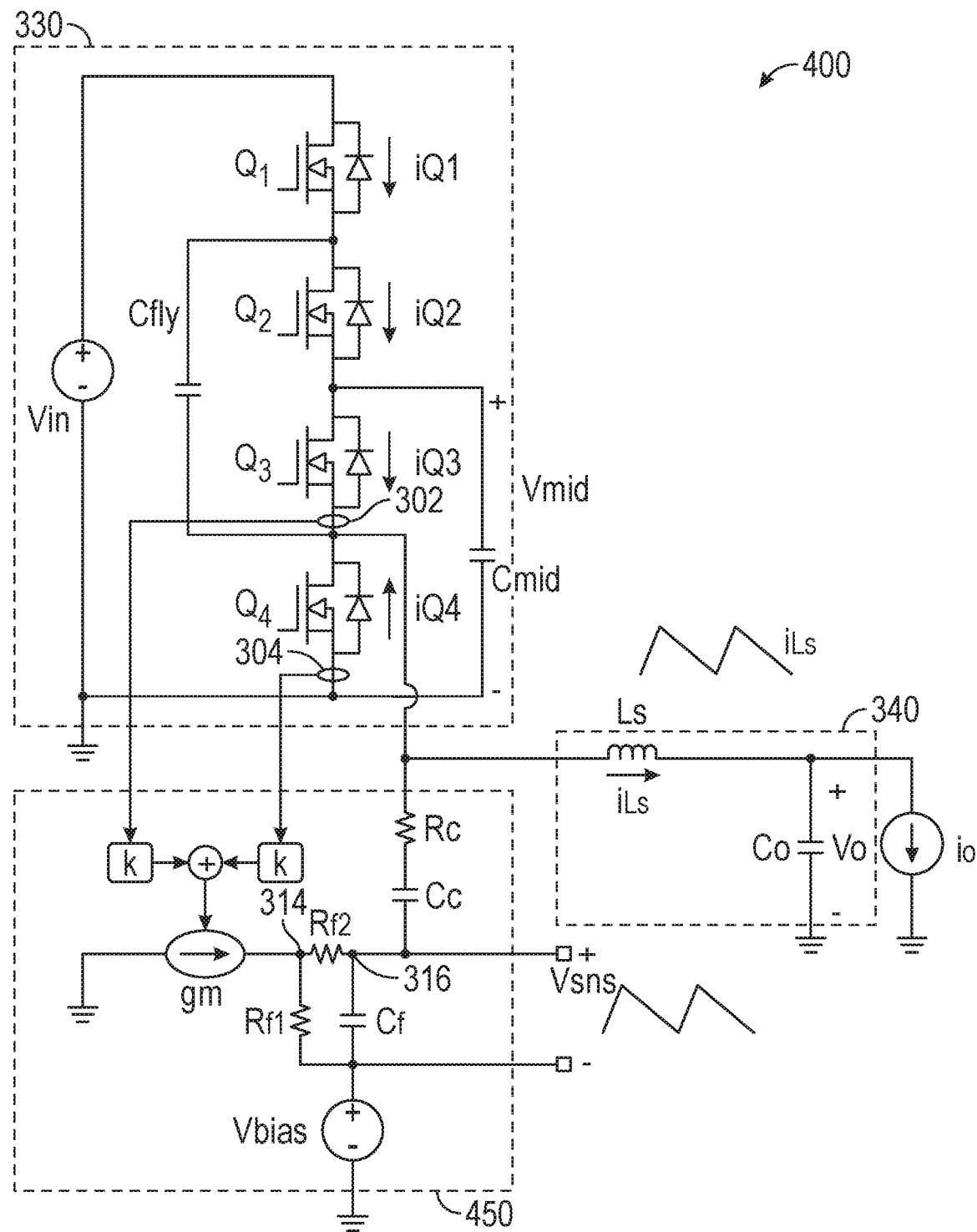
FIG. 4 is a circuit diagram of an exemplary hybrid power converter with a feedback circuit, according to some embodiments.

FIG. 4 is a circuit diagram of an exemplary hybrid power converter with a feedback circuit, according to some embodiments. Hybrid power converter 400 of FIG. 4 includes switching circuit 330 and LC circuit 340 of FIG. 3. Hybrid power converter 400 also includes detection circuit 450 that is consistent with detection circuit 350 of FIG. 3 with a difference that detection circuit 450 further includes a resistor Rf2 between nodes 314 and 316 of the low pass filter of detection circuit 450. A value of resistor Rf2 may be used to modify the low pass filter and control the attenuation of high frequencies. Detection circuit 450 also includes current sensors 302 and 304 for respectively detecting a current, e.g., drain-to-source current Ids, of switching transistors Q3 and Q4.

Figure 5:
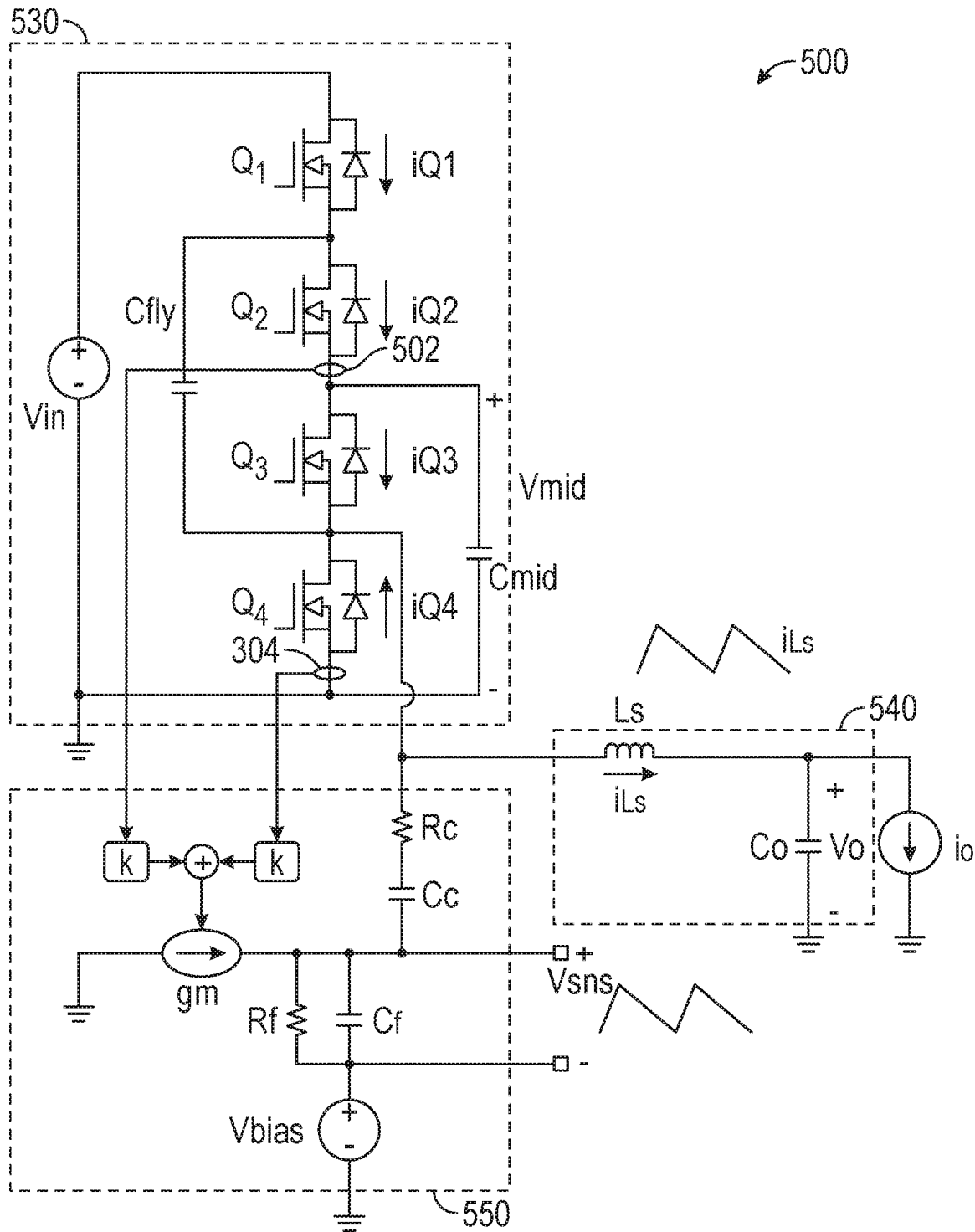
FIG. 5 is a circuit diagram of an exemplary hybrid power converter with a feedback circuit, according to some embodiments.

FIG. 5 is a circuit diagram of an exemplary hybrid power converter with a feedback circuit, according to some embodiments. Hybrid power converter 500 of FIG. 5 includes switching circuit 530 that is consistent with switching circuit 330 of FIG. 3 and LC circuit 540 that is consistent with LC circuit 340 of FIG. 3. Hybrid power converter 500 also includes detection circuit 550 that is consistent with detection circuit 350 of FIG. 3 with a difference that detection circuit 550 includes current sensors 502 and 304 for respectively detecting a current, e.g., drain-to-source current Ids, of switching transistors Q2 and Q4. The detected currents of the switching transistors Q2 and Q4 may then be amplified by current amplifiers 306 and 308 and then summed by summation circuit 310. The sum of the amplified currents of the switching transistors Q2 and Q4 may further pass through another amplifier 312 that is coupled between ground 220 and node 314 of a low pass filter comprising Rf and Cf in parallel. In some examples, the output voltage of the low pass filter is essentially proportional to current io which is a DC value of current iLs. Thus, current io may be assumed to be proportional to a DC value of a sum of the currents of switching transistors Q2 and Q4. Additionally, as discussed, the resistor Rf2 may be added to the low pass filter of detection circuit 550 to further control the attenuation of high frequencies.

Figure 6:
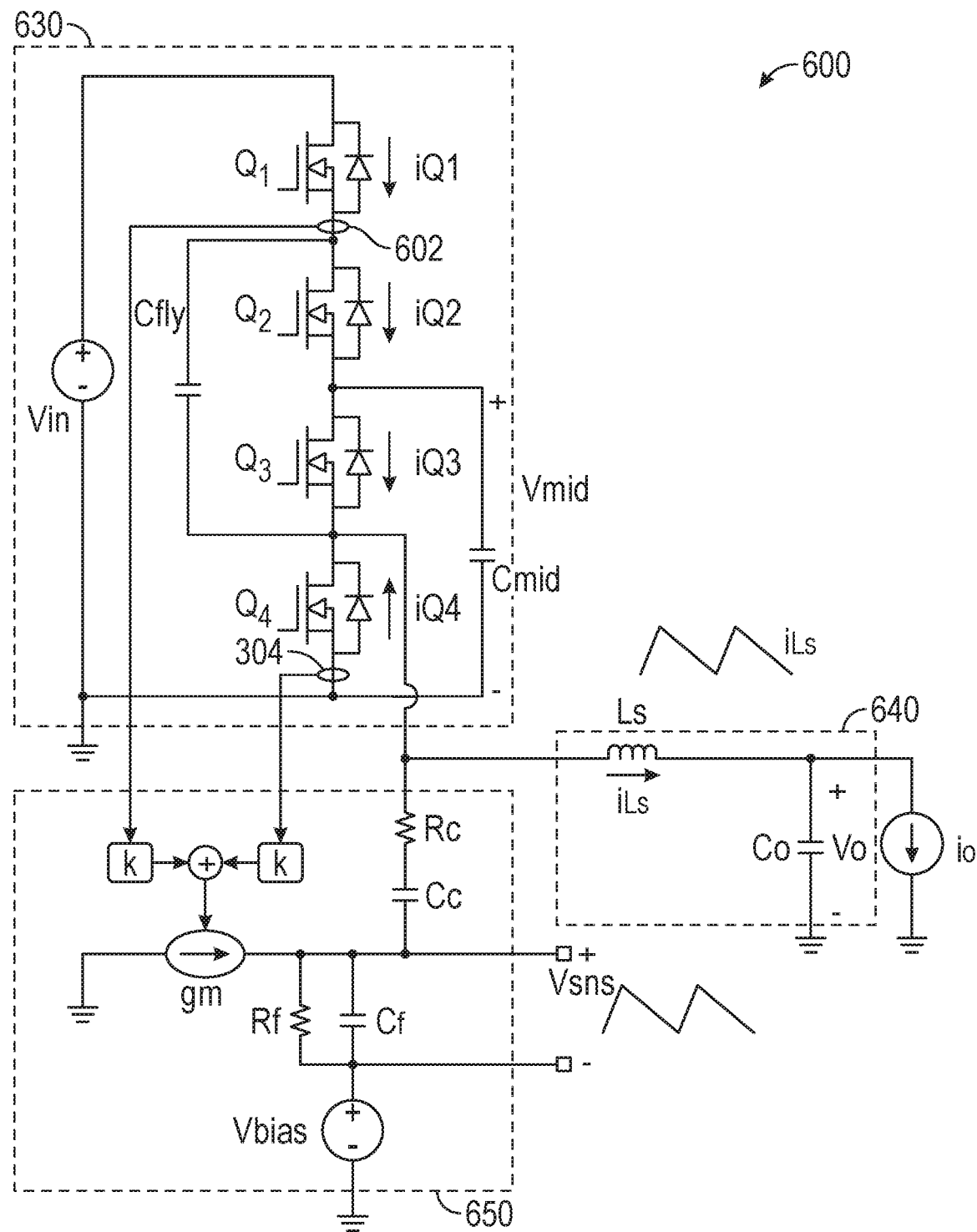
FIG. 6 is a circuit diagram of an exemplary hybrid power converter with a feedback circuit, according to some embodiments.
Figure 7:
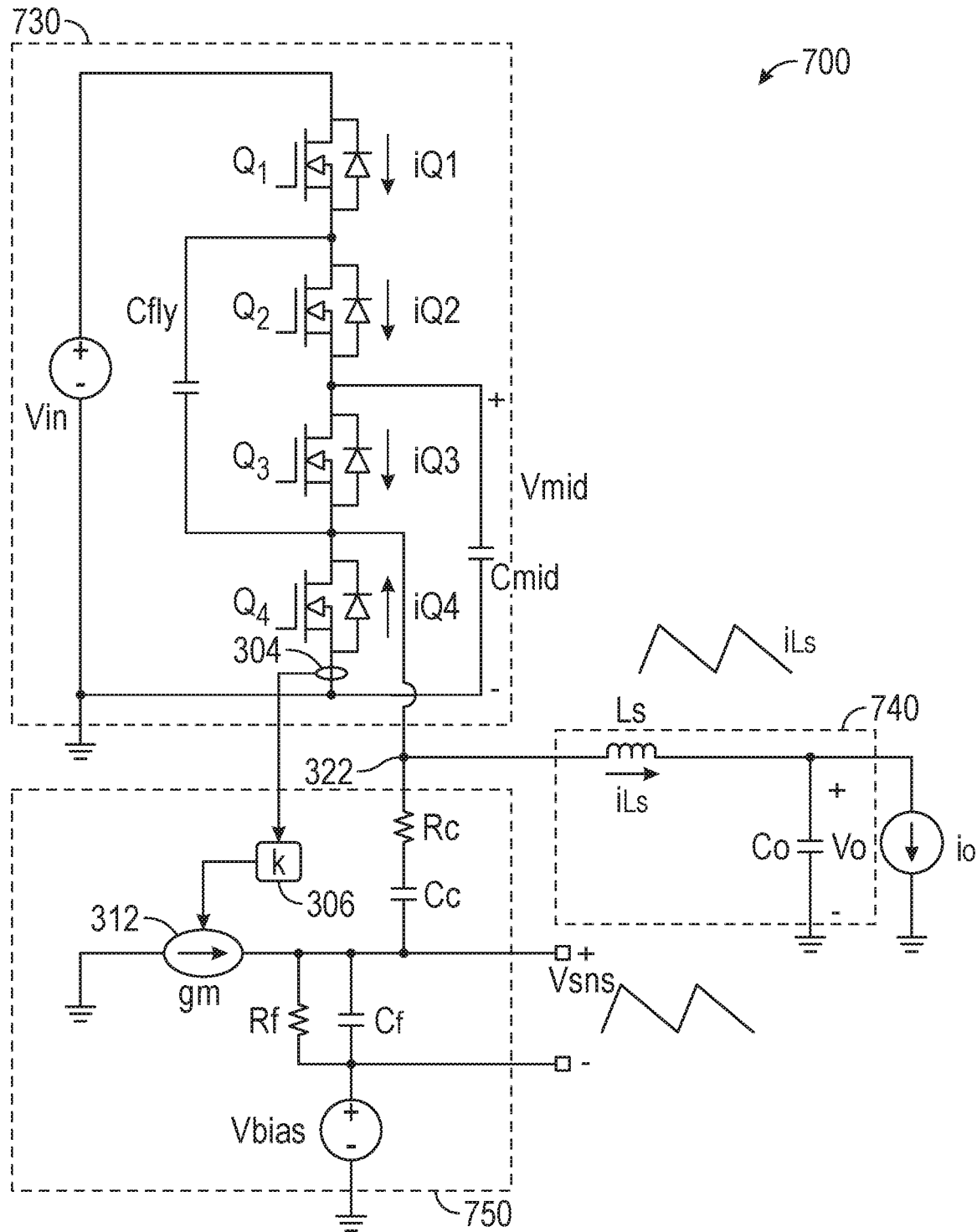
FIG. 7 is a circuit diagram of an exemplary hybrid power converter with a feedback circuit, according to some embodiments.

FIG. 6 is a circuit diagram of an exemplary hybrid power converter with a feedback circuit, according to some embodiments. Hybrid power converter 600 of FIG. 6 includes switching circuit 630 that is consistent with switching circuit 330 of FIG. 3 and LC circuit 640 that is consistent with LC circuit 340 of FIG. 3. Hybrid power converter 600 also includes detection circuit 650 that is consistent with detection circuit 350 of FIG. 3 with a difference that detection circuit 650 includes current sensors 602 and 304 for respectively detecting a current, e.g., drain-to-source current Ids, of switching transistors Q1 and Q4. The detected currents of the switching transistors Q1 and Q4 may then be amplified by current amplifiers 306 and 308 and then summed by summation circuit 310. The sum of the amplified currents of the switching transistors Q1 and Q4 may further pass through another amplifier 312 that is coupled between ground 220 and node 314 of a low pass filter comprising Rf and Cf in parallel. In some examples, the output voltage of the low pass filter is essentially proportional to current io, which is a DC value of current iLs. Thus, current io may be assumed to be proportional to a DC value of a sum of the currents of switching transistors Q1 and Q4. Additionally, as discussed, the resistor Rf2 may be added to the low pass filter of detection circuit 650 to further control the attenuation of high frequencies FIG. 7 is a circuit diagram of an exemplary hybrid power converter with a feedback circuit, according to some embodiments. Hybrid power converter 700 of FIG. 7 includes switching circuit 730 that is consistent with switching circuit 330 of FIG. 3 and LC circuit 740 that is consistent with LC circuit 340 of FIG. 3. Hybrid power converter 700 also includes detection circuit 750 that is consistent with detection circuit 350 of FIG. 3 with a difference that detection circuit 750 includes current sensor 304 for detecting a current, e.g., drain-to-source current Ids, of switching transistor Q4 and does not detect current of other switching transistors. Current amplifier 306 may then amplify the detected current of the switching transistor Q4. The amplified current of the switching transistor Q4 may further pass through another amplifier 312 that is coupled between ground 220 and node 314 of a low pass filter comprising Rf and Cf in parallel. In some examples, detection circuit 750 is used when the hybrid power converter is running with a duty cycle of the switching signals that is much smaller than 0.5, e.g., it is 0.1. In some examples, a DC average of a current of switching transistor Q4 is essentially equal to a DC value of current iLs times $(1-D/2)$ where D is the duty cycle of the switching signals, e.g., switching signal 252 of FIG. 2B. Therefore, when D=0.1, an error when using the DC (low frequency) portion of the current of switching transistor Q4 instead of the DC (low frequency) portion of current iLs is less than 5 percent. Thus, in some examples, the output voltage of the low pass filter is essentially proportional to current io, which is a DC value of current iLs. Thus, when the duty cycle is small, current io may be assumed to be proportional to a DC value the currents of switching transistors Q4 that is coupled across the input port of the LC circuit. Additionally, as discussed, the resistor Rf2 may be added to the low pass filter of detection circuit 750 to further control the attenuation of high frequencies.

Figure 8:
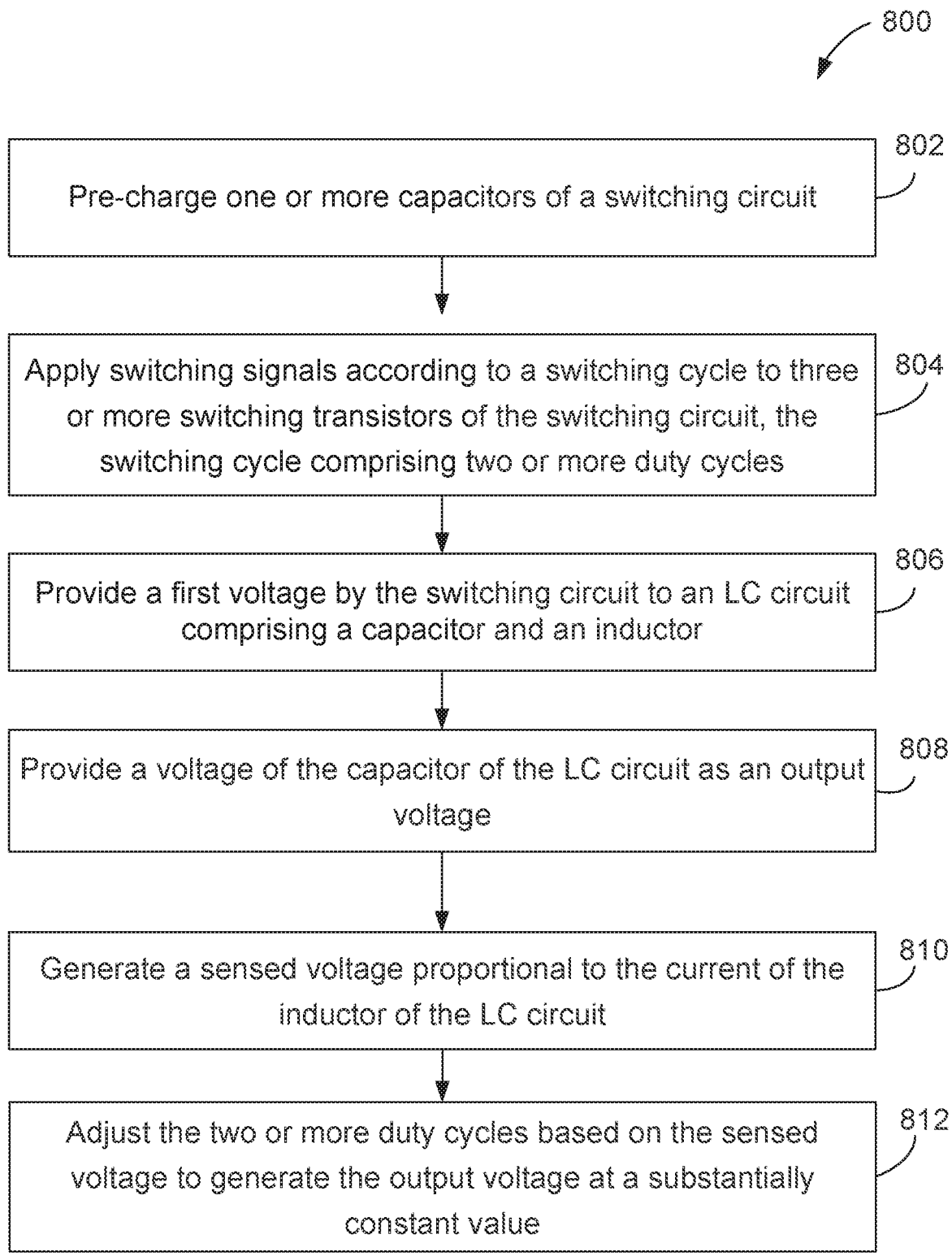
FIG. 8 is a flowchart of an exemplary process for operating a hybrid power converter with a feedback circuit, according to some embodiments.

FIG. 8 is a flowchart of an exemplary process for operating a hybrid power converter with a feedback circuit, according to some embodiments described herein. For explanatory purposes, the various blocks of exemplary process 800 are described herein with reference to FIG. 2A and FIGS. 3-7, and the components and/or processes described herein. The one or more of the blocks of process 800 may be implemented, for example, by any of the power converter circuits described herein. In some implementations, one or more of the blocks may be implemented apart from other blocks, and by one or more different processors or devices. Further for explanatory purposes, the blocks of exemplary process 800 are described as occurring in serial, or linearly. However, multiple blocks of exemplary process 800 may occur in parallel. In addition, the blocks of exemplary process 800 need not be performed in the order shown and/or one or more of the blocks of exemplary process 800 need not be performed.

The process 800 begins at step 802; one or more capacitors of a switching circuit is pre-charged. The pre-charging may be performed by connecting a pre-charging circuit that includes one or more current sources to the capacitors of the switching circuit. In some embodiments, during pre-charging the switching transistors of the switching circuits are turned off. In some examples, the control circuit 102 may turn off the switching transistors of switching circuits 330, 530, 630, and 730 of FIGS. 3-7 and may connect the pre-charging circuit to the capacitors, e.g., capacitors Cfly and Cmid of the switching circuits to pre charge them. After pre-charging, the control circuit may disconnect the pre-charging circuit and may start switching the switching transistors of the switching circuits 330, 530, 630, and 730. In some examples, an input voltage Vin is coupled the switching circuits and the one or more capacitors of a switching circuits are charged to ½ of Vin. In some embodiments, the pre-charging prevents high voltage values across the switching transistors of the switching circuit at an initial stage of starting a hybrid power converter.

In step 804, switching signals are applied according to a switching cycle to a switching circuit. The switching circuit includes a plurality three or more switching transistors that are connected in series and have a first end and a second end. The switching circuit is shown in FIG. 2A and FIGS. 3-7. Switching circuits 230, 330, 530, 630, and 730 include four switching transistors Q1-Q4 that are connected in series. The switching signals are shown as switching signals 250 in FIG. 2B. The switching signals turn the switching transistors Q1 and Q3 on for a duration of Ton and turn the switching transistors Q1 and Q3 off for a duration of Toff. The switching circuit includes a plurality of switching nodes. As shown, FIG. 2A and FIGS. 3-7 includes node 210, 212, 214, 216, and 218. In some embodiments, the switching cycle comprises two or more switching signals where each one of the switching signals may have a different duty cycle such that two duty cycles can be inverse of each other. In some examples, different switching transistors are switched on or off in phase opposition, e.g., complementary to each other. For example, by applying switching signals 250 switching transistors Q1 and Q3 are turned on and switching transistors Q2 and Q4 are turned off and vice versa.

In step 806, a first voltage is provided by the switching circuit to an LC circuit that includes a capacitor and an inductor. In some examples, the first voltage is a series of pulses that are provided to the LC circuit to generate an inductor current in the inductor and to generate a voltage across the capacitor of the LC circuit. As shown in FIG. 2A and FIGS. 3-7, the series of pulses are applied via the input port of LC circuit that is coupled between nodes 216 and 218. In some examples, the series of pulses are applied via a connection between the LC circuit and the switching circuit across switching transistor Q4.

In step 808, a voltage of the capacitor of the LC circuit is provided as an output voltage of the hybrid power converter. In some examples, as shown in FIG. 2A and FIGS. 3-7, the voltage across capacitor Co is provided as output voltage Vo. In some examples, at least one duty cycle of the switching signals is increased to a predefined level to increase the output voltage to a predefined voltage value.

In step 810, a sensed voltage proportional to the current of the inductor of the LC circuit is generated. In some embodiments, the sensed voltage is used to adjust one or more duty cycles of the switching signals. In some examples, the sensed voltage is used to adjust the duty cycle the series of pulses that are provided to the LC circuit. As show in FIG. 2A and FIGS. 3-7, the sensed voltage Vsns that is essentially proportional to the current of the inductor is generated by detection circuits 350, 450, 550, 650, and 750. The generation of sensed voltage Vsns is described with respect to FIG. 2A and FIGS. 3-7. The sensed voltage Vsns may be provided as feedback through interface 104 to control circuit 102. The Vsns may be used by control circuit 102 to adjust the duty cycle of the switching signals, e.g., switching signals 106, provided by the control circuit 102. In some examples, control circuit 102 may use the Vsns to adjust two or more duty cycles of the switching signals 106.

In step 812, the two or more duty cycles are adjusted based on the sensed voltage to generate the output voltage at an essentially constant value. In some examples, two duty cycles are inverse of each other than thus when one duty cycle increases the other duty cycle decreases. In some examples, the output voltage of the hybrid power converter is a fraction of the input voltage Vin of the hybrid power converter, e.g., ½ Vin or ¼ Vin.

Figure 9:
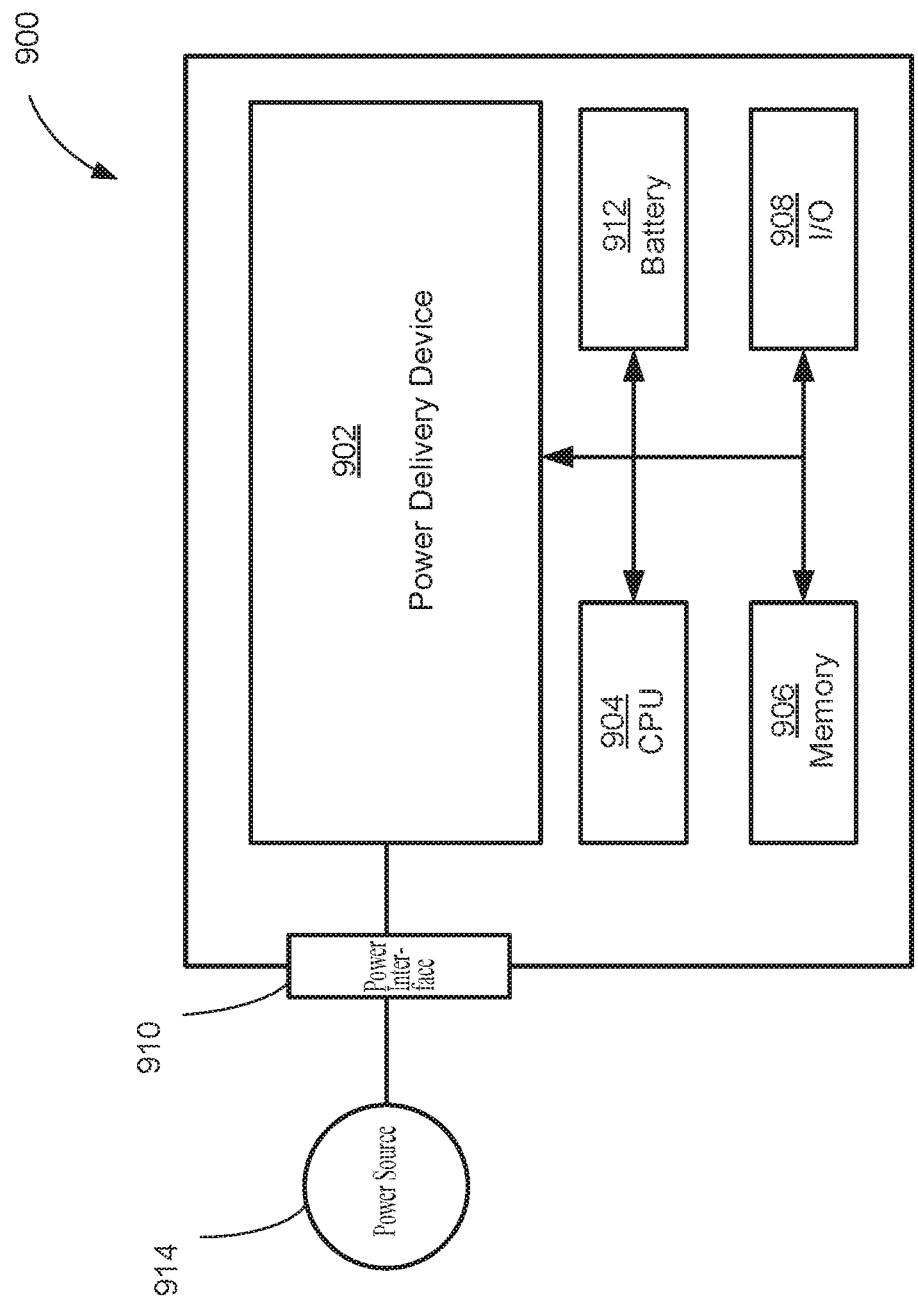
FIG. 9 is a diagram of an exemplary electronic system that implements a hybrid power converter.

FIG. 9 is a diagram of an exemplary electronic system 900 that implements a PWM power converter, according to various implementations described herein. Electronic system 900, in combination with the disclosure regarding FIG. 2A and FIGS. 3-7, may be any electronic device utilizing power from a power source. For example, electronic system 900 may be representative of a computing device (e.g., a personal computer or a mobile device such as a smartphone, tablet computer, laptop, PDA, a wearable such as a watch or band, or combination thereof), or a consumer appliance, television or other display device, radio or telephone, home audio system, or the like.

In some implementations, electronic system may include a power delivery device 902 (e.g., a power supply) and a load. The load may include various components of electronic system 900, including one or more of a central processing unit (CPU) 904, various memory systems 906, one or more input and/or output (I/O) devices 908, a power interface 910, and one or more batteries 912. The CPU 904 may be a multi-core processor, a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

A memory system 906 may include, for example, volatile memory used to temporarily store data and information used to manage electronic system 900, a random access memory (RAM), and/or non-volatile memory such as a magnetic disk, flash memory, peripheral SSD, and the like. I/O device 908 may include an input device such as a keyboard, a touch screen, a touch pad, voice control system, or other device for input of data. I/O device 908 may include an output device such as a display device, audio device (e.g., a speaker), or data interface (e.g., a host data bus) for output of data. In some implementations, one or more elements of electronic system 900 can be integrated into a single chip. In some implementations, the elements can be implemented on two or more discrete components.

Power delivery device 902 may include any of the previously described power converter circuits (including an auxiliary bypass circuit), including a corresponding control circuit. Accordingly, power delivery device 902 may be configured (e.g., as a step up or step down converter) to convert a first voltage to a second voltage, different from the first voltage. Power delivery device 902 may receive an input power (e.g., at a voltage Vin) from an external power source 914 via power interface 910. The input power may be a DC power. In some implementations, the input power may be an alternating current source that is converted to DC (e.g., by power interface 910) before being utilized by power delivery device 902. Additionally, or in the alternative, the input power may be DC from battery 912.

Power delivery device 902 may produce a voltage according to the load requirements of various components of electronic system 900. In this regard, power delivery device 902 may implement multiple different types of converter circuits to accommodate different load requirements of the various components of electronic system 900. Additionally or in the alternative, power delivery device 902 may be configured to provide charge to battery 912 (e.g., as part of a battery charger system) based on power from external power source 914.

It is understood that illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the present disclosure.

It is understood that the specific order or hierarchy of steps in the processes disclosed is presented as an illustration of some exemplary approaches. Based upon design preferences and/or other considerations, it is understood that the specific order or hierarchy of steps in the processes may be rearranged. For example, in some implementations some of the steps may be performed simultaneously. Thus, the accompanying method claims present elements of the various steps in a sample order, and are not meant to be limited to the specific order or hierarchy presented.

The previous description is provided to enable any person skilled in the art to practice the various aspects described herein. The previous description provides various examples of the present disclosure, and the present disclosure is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a circuit or processor configured to monitor and control an operation or a component may also mean the circuit or processor being programmed to monitor and control the operation or being operable to monitor and control the operation. Likewise, a circuit or processor configured to execute code may be construed as a circuit or processor programmed to execute code or operable to execute code.

The terms "start-up" and "power-up" are intended to include, but not be limited to, the plain meaning of each respective term, and for the purposes of this disclosure may be used interchangeably. The terms "start-up" and "power-up" may include, for example, a point in time at which a circuit is turned on (e.g., started) and/or a period of time shortly thereafter.

A phrase such as an "aspect" does not imply that such aspect is essential to the present disclosure or that such aspect applies to all configurations of the present disclosure. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the present disclosure or that such implementation applies to all configurations of the present disclosure. A disclosure relating to an implementation may apply to all aspects, or one or more aspects. An implementation may provide one or more examples. A phrase such as an "implementation" may refer to one or more implementations and vice versa. A phrase such as a "configuration" does not imply that such configuration is essential to the present disclosure or that such configuration applies to all configurations of the present disclosure. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example, instance, or illustration." Any aspect described herein as "exemplary" is not necessarily to be construed as preferred or advantageous over other aspects. In addition, description of a feature, advantage or mode of operation in relation to an example combination of aspects does not require that all practices according to the combination include the discussed feature, advantage or mode of operation.

As used herein, the singular forms "a", "an" and "the" are intended to include the plural forms as well, unless the context clearly indicates otherwise. Numeric terms such as "first", "second", "third," etc., unless specifically stated, are not used herein to imply a particular ordering of the recited structures, components, capabilities, modes, steps, operations, or combinations thereof with which they are used.

The terms "comprise," "comprising," "includes," and "including", as used herein, specify the presence of one or more recited structures, components, capabilities, modes, steps, operations, or combinations thereof, but do not preclude the presence or addition of one or more other structures, components, capabilities, modes, steps, operations, or combinations thereof.

What is claimed is:

1. A hybrid power converter, comprising:
    a switching circuit comprising three or more switching transistors connected in series;
    an LC circuit comprising a capacitor and an inductor connected in series, the LC circuit is coupled to the switching circuit to receive a given voltage from the switching circuit, and
    a detection circuit coupled to the switching circuit and the LC circuit, the detection circuit comprising a first filter and a second filter and configured to generate:
        a first sensed voltage proportional to a current through the inductor based on a first voltage produced by a first filter capacitor of the first filter; and
        a second sensed voltage based on a second voltage produced by a second filter capacitor of the second filter, a total sensed voltage being produced as a combination of the first and second sensed voltages, wherein the switching circuit is configured to generate the given voltage based on the total sensed voltage and to generate, based on the total sensed voltage, an essentially constant output voltage across the capacitor of the LC circuit.

2. The hybrid power converter of claim 1, further comprising a control circuit, wherein the control circuit is coupled to the switching circuit and the detection circuit, wherein the control circuit is configured to receive the total sensed voltage from the detection circuit and to provide switching signals for the three or more switching transistors of the switching circuit to switch the three or more switching transistors according to a switching cycle to provide the given voltage to the LC circuit.

3. The hybrid power converter of claim 2, wherein the control circuit is configured to generate the switching signals according to the switching cycle, and wherein the switching circuit is configured to provide the given voltage as a series of pulses based on the switching cycle to the LC circuit to cause the LC circuit to provide the essentially constant output voltage.

4. The hybrid power converter of claim 2, wherein the three or more switching transistors are configured to be switched on or off complementary to each other by the control circuit, wherein the control circuit is configured to provide a first and a second duty cycle for the switching transistors, and wherein the first duty cycle is inverse of the second duty cycle.

5. The hybrid power converter of claim 2, wherein the switching circuit comprises a first end and a second end and one or more capacitors, wherein the one or more capacitors are coupled between two nodes of a plurality of nodes, wherein the plurality of nodes comprises a respective node linking each of the three or more switching transistors to an adjacent transistor of the three or more switching transistors and the first end and the second end, the hybrid power converter further comprising:
    a pre-charging circuit coupled to the switching circuit and the control circuit, wherein the control circuit is configure to turn off the three or more switching transistors and to couple the pre-charging circuit to the one or more capacitors of the switching circuit to charge the one or more capacitors of the switching circuit.

6. The hybrid power converter of claim 2, wherein the detection circuit comprises:
    a first current sensor coupled to a first switching transistor of the three or more switching transistors and configured to detect a first current of the first switching transistor and to generate a first sensed current proportional to the first current;
    a second current sensor coupled to a second switching transistor of the three or more switching transistors and configured to detect a second current of the second switching transistor and to generate a second sensed current proportional to the second current;
    a summation circuit configured to sum the first and second sensed currents and to generate a third current proportional to a sum of the first and second sensed currents, the first filter comprising a low pass filter coupled to the summation circuit and configured to receive the third current and generate the first sensed voltage; and
    a high pass filter coupled to the inductor of the LC circuit and configured to pass a fourth current proportional to a high-frequency ripple current of the inductor and to generate the second sensed voltage.

7. The hybrid power converter of claim 6, wherein the LC circuit is coupled to the switching circuit across the first switching transistor, and wherein the second switching transistor is connected to the first switching transistor.

8. The hybrid power converter of claim 6, wherein the switching transistors are MOSFETs and the first and second current sensors are configured to measure drain to source voltages of the switching transistors and to divide the measured drain to source voltages by a predefined drain to source resistance to determine the first and second currents of the first and second switching transistors.

9. The hybrid power converter of claim 2, wherein the detection circuit comprises:
    a first current sensor coupled to a first switching transistor of the three or more switching transistors and configured to detect a first current of the first switching transistor and to generate a first sensed current proportional to the first current, wherein the first switching transistor is coupled across an input port of the LC circuit,
    a low pass filter, as the first filter, coupled to the first current sensor and configured to receive the first current and to generate the first sensed voltage,
    a high pass filter, as the second filter, coupled to the inductor of the LC circuit and configured to pass a second current proportional to a high-frequency ripple current of the inductor and to generate the second sensed voltage; and
    a summation circuit coupled to the low pass and high pass filters and configured to sum the first and second sensed voltages and to generate the total sensed voltage, wherein the summation circuit is coupled to the control circuit to provide the total sensed voltage to the control circuit, where in the control circuit is configured to adjust the switching signals based on the total sensed voltage to generate an essentially constant output voltage for the hybrid power converter.

10. The hybrid power converter of claim 1, wherein the first filter comprises a low pass filter and the second filter comprises a high pass filter, wherein an input voltage is coupled to the switching circuit, and wherein a value of the output voltage of the hybrid power converter is a fraction of a value of the input voltage.

11. The hybrid power converter of claim 1, wherein the three or more switching transistors include four switching transistors.

12. The hybrid power converter of claim 1, wherein the detection circuit comprises a summation circuit configured to sum first and second currents of respective first and second switching transistors of the three or more switching transistors, the summation circuit outputs a third current as a sum of the first and second currents.

13. The hybrid power converter of claim 1, wherein the first sensed voltage is proportional to a low pass version of the current of the inductor, the second sensed voltage is proportional to a high pass version of the current of the inductor, and the total sensed voltage is proportional to the current of the inductor.

14. The hybrid power converter of claim 1, wherein the first filter is coupled to a summation circuit and is configured to receive a third current to generate the first sensed voltage.

15. The hybrid power converter of claim 1, wherein the first sensed voltage is essentially proportional to a DC value of the current of the inductor.

16. A method of operating a hybrid power converter, comprising:
applying switching signals according to a switching cycle to three or more switching transistors of a switching circuit, the switching cycle comprises two or more duty cycles for the switching signals,
providing a given voltage by the switching circuit to an LC circuit comprising a capacitor and an inductor connected in series;
providing a voltage of the capacitor of the LC circuit as an output voltage of the hybrid power converter;
generating, by a detection circuit comprising a first filter and a second filter:
a first sensed voltage proportional to an inductor current of the LC circuit based on a first voltage produced by a first filter capacitor of the first filter; and
a second sensed voltage based on a second voltage produced by a second filter capacitor of the second filter, a total sensed voltage being produced as a combination of the first and second sensed voltages; and
adjusting the two or more duty cycles based on the total sensed voltage to generate the output voltage at an essentially constant value.

17. The method of claim 16, further comprising pre-charging one or more capacitors of a switching circuit to one or more respective voltages, wherein the three or more switching transistors are turned off while pre-charging, further comprising generating, by the detection circuit, another sensed voltage based on a second voltage produced by a second filter capacitor of a second filter of the detection circuit, wherein a total sensed voltage is produced as a combination of the first and second voltages.

18. The method of claim 16, wherein the switching signals comprise two or more series of pulses with the two or more duty cycles, the method further comprising:
increasing at least one of the two or more duty cycles to increase the output voltage to a predefined value.

19. A hybrid power converter, comprising:
means for applying switching signals to a switching circuit,
means for turning on or off switching transistors of the switching circuit with the switching signals;
means for applying an input voltage to the switching circuit;
means for providing a series of pulses to an LC circuit;
means for generating, by a detection circuit comprising a first filter and a second filter:
a first sensed voltage proportional to an inductor current of the LC circuit based on a first voltage produced by a first filter capacitor of the first filter; and
a second sensed voltage based on a second voltage produced by a second filter capacitor of the second filter, a total sensed voltage being produced as a combination of the first and second sensed voltages;
means for controlling duty cycles of the switching signals; and
means for providing an essentially constant output voltage by the LC circuit based on the total sensed voltage.

* * * * *